United States Patent
Mikkelsen et al.

(10) Patent No.: US 6,243,058 B1
(45) Date of Patent: Jun. 5, 2001

(54) TRIBO-ADDRESSED AND TRIBO-SUPPRESSED ELECTRIC PAPER

(75) Inventors: James C. Mikkelsen; Nicholas K. Sheridon, both of Los Altos; Edward A. Richley, Palo Alto, all of CA (US)

(73) Assignee: Xerox Coporation, Stamford, CT (US)

( * ) Notice: Subject to any disclaimer, the term of this patent is extended or adjusted under 35 U.S.C. 154(b) by 0 days.

(21) Appl. No.: 09/275,880
(22) Filed: Mar. 25, 1999
(51) Int. Cl.$^7$ .................................................. G09G 3/34
(52) U.S. Cl. .................................................. 345/84; 345/85
(58) Field of Search ........................... 345/84, 85, 173

(56) References Cited

U.S. PATENT DOCUMENTS

| | | |
|---|---|---|
| 4,126,854 | 11/1978 | Sheridon . |
| 4,143,103 | 3/1979 | Sheridon . |
| 5,389,945 | 2/1995 | Sheridon . |
| 5,739,801 | 4/1998 | Sheridon . |

OTHER PUBLICATIONS

Anne Chiang et al., "A Stylus Writable Electrophoretic Display Device", SID 79 Digest.

N.K. Sheridon et al., "The Gyricon—A Twisting Ball Display", Proceeding of the S.I.D., vol. 18/3, Third and Fourth Quarters, pp. 289–293, 1977.

*Primary Examiner*—Steven Saras
*Assistant Examiner*—Srilakshmi Kumar
(74) *Attorney, Agent, or Firm*—Oliff & Berridge, PLC

(57) ABSTRACT

A display is provided with an insulative layer whose electrical properties have been selected so that the display can be addressed by the effects of triboelectrically generated charges and thus requires no stylus or special writing utensil. Thus, the display can be addressed by dragging a finger across the display. Alternately, the display is provided with an insulafive layer whoes electrical properties have been selected so that the display is addressed with a stylus and is immune from the effects of stray riboelectrically generated charges.

11 Claims, 1 Drawing Sheet

TRIBO-ADDRESSED AND TRIBO-SUPPRESSED ELECTRIC PAPER

BACKGROUND OF THE INVENTION

1. Field of Invention

The invention relates to the field of visual displays. More particularly, the invention relates to a gyricon or twisting ball visual display having a controlled response to triboelectric charge effects.

2. Description of Related Art

Paper has traditionally been a preferred medium for the presentation and display of text and images. Paper has several characteristics that make it a desirable display medium, including the fact that it is lightweight, thin, portable, flexible, foldable, high-contrast, low-cost, relatively permanent, and readily configured into a myriad of shapes. It can maintain its displayed images without using any electricity. Paper can also be read in ambient light and can be written or marked upon with a pen, pencil, paintbrush, or any number of other implements, including a computer printer.

Unfortunately, paper is not well suited for real-time display purposes. Real-time imagery from computer, video, or other sources cannot be displayed directly with paper, but must be displayed by other means, such as by a cathode-ray tube (CRT) display or a liquid-crystal display (LCD). However, Teal-time display media lack many of the desirable qualities of paper, such as physical flexibility and stable retention of the displayed image in the absence of an electric power source.

Electric paper combines the desirable qualities of paper with those of real-time display media. Like ordinary paper, electric paper can be written and erased, can be read in ambient light and can retain imposed information in the absence of an electric field or other external retaining force. Also like ordinary paper, electric paper can be made in the form of a light-weight, flexible, durable sheet that can be folded or rolled into a tubular form about any axis and placed into a shirt or coat pocket, and then later retrieved, re-straightened, and read without loss of information. Yet unlike ordinary paper, electric paper can be used to display fall-motion and other real-time imagery as well as still images and text. Thus, electric paper can be used in a computer system display screen or a television.

The gyricon, also called the twisting-ball display, rotary ball display, particle display, dipolar particle light valve, etc., provides a technology for making electric paper. A gyricon display is a display that can be altered or addressed. A gyricon display is made up of a multiplicity of optically anisotropic balls which can be selectively rotated to present a desired surface to an observer.

The optical anisotropy of the gyricon balls is provided by dividing the surface of each gyricon ball into two or more portions. One portion of the surface of each gyricon ball has a first light reflectance or color. At least one other portion of the surface of the gyricon ball has a different color or a different light reflectance. For example, a gyricon ball can have two distinct hemispheres, one black and the other white. Additionally, each hemisphere can have a distinct electrical characteristic, e.g., a zeta potential with respect to a dielectric fluid. Accordingly, the gyricon balls are electrically as well as optically anisotropic. It is conventionally known that when particles are dispersed in a dielectric liquid, the particles acquire an electric charge related to the zeta potential of their surface coating.

The black-and-white gyricon balls are embedded in a sheet of optically transparent material, such as an elastomer layer, that contains a multiplicity of spheroidal cavities. Each of the spheroidal cavities is permeated by a transparent dielectric fluid, such as a plasticizer. The fluid-filled cavities accommodate the gyricon balls, one gyricon ball per cavity, to prevent the balls from migrating within the sheet. Each cavity is slightly larger than the size of the gyricon ball so that each gyricon ball can rotate or move slightly within its cavity.

A gyricon ball can be selectively rotated within its respective fluid-filled cavity by applying an electric field, so that either the black or white hemisphere of the gyricon ball is exposed to an observer viewing the surface of the sheet. By applying an electric field in two dimensions, for example, using a matrix addressing scheme, the black and white sides of the balls can be caused to appear as the image elements, e.g., pixels or subpixels, of a displayed image.

Gyricon displays are described further in U.S. Pat. No. 5,389,945 to Sheridon, incorporated herein by reference in its entirety. The 945 patent discloses that gyricon displays can be made that have many of the desirable qualities of paper, such as flexibility and stable retention of a displayed image in the absence of power, that are not found in CRTs, LCDs, or other conventional display media. Gyricon displays can also be made that are not paper-like, for example, in the form of rigid display screens for flat-panel displays.

SUMMARY OF THE INVENTION

Conventional gyricon displays, as described in U.S. Pat. Nos. 4,126,854, 4,143,103 and 5,739,801, each incorporated herein by reference in its entirety, require a source of electrical power. Gyricon materials respond to the application of high electric fields. However, the electric current requirements can be very low. Basically, the energy required to change the state of the display is the same as that needed to charge the capacitance of the display structure.

As a result, according to this invention, tribo-electrically generated charges can be used to write, re-write or erase a gyricon sheet.

This invention provides a gyricon sheet encapsulated between a conducting plate, and a thin, insulating film.

The invention separately provides a gyricon display addressable by a tribo-electric charge.

The invention separately provides for erasing an image formed on a gyricon display using a tribo-electric charge.

The invention separately provides a gyricon display that does not require an external electric power source to form or erase an image from the gyricon display.

The invention separately provides a gyricon display having a substrate that is sufficiently conductive to dissipate the small amounts of charge generated by tribo-electric effects.

According to one exemplary embodiment of the electric paper of this invention, a tribo-electric charge induced on the surface of an insulating film generates a sufficient electric field to change the state of one or more gyricon balls of the electric paper.

According to a second exemplary embodiment of the electric paper of this invention, the tribo-electrically addressable electric paper can be used to form a whiteboard that does not require chalk, solvent based pens or, in fact, any type of pen.

In the exemplary embodiment of the tribo-electrically addressable electric paper of this invention, sufficient electric energy to produce an image is provided by tribo-electric charges stored and dissipated on a surface of the display.

Gyricon displays designed to be addressed by a stylus can sometimes be adversely affected by tribo-electric effects. For example, in the case of gyricon displays typically addressed by an electrically driven stylus, inadvertently contacting of the gyricon sheet with the user's finger rather than with the writing stylus can, under certain conditions, cause rotation of the gyricon balls due to tribo-electric effects.

In another exemplary embodiment of the electric paper of this invention, the insulative layer of the electric paper is sufficiently conductive to dissipate small amounts of tribo-electrically generated charge. That is, the elastomer layer effectively discharges the tribo electrically generated charge in a time that is less than that required to cause ball rotation. Intentionally applied voltage, as from a powered voltage source such as a writing stylus, has an effectively infinite supply of charge and will deliver a sustained voltage until the desired writing occurs.

BRIEF DESCRIPTION OF THE DRAWINGS

The exemplary embodiments of the invention will be described in detail, with reference to the following figures in which.

DETAILED DESCRIPTION OF PREFERRED EMBODIMENTS

Figure 1:
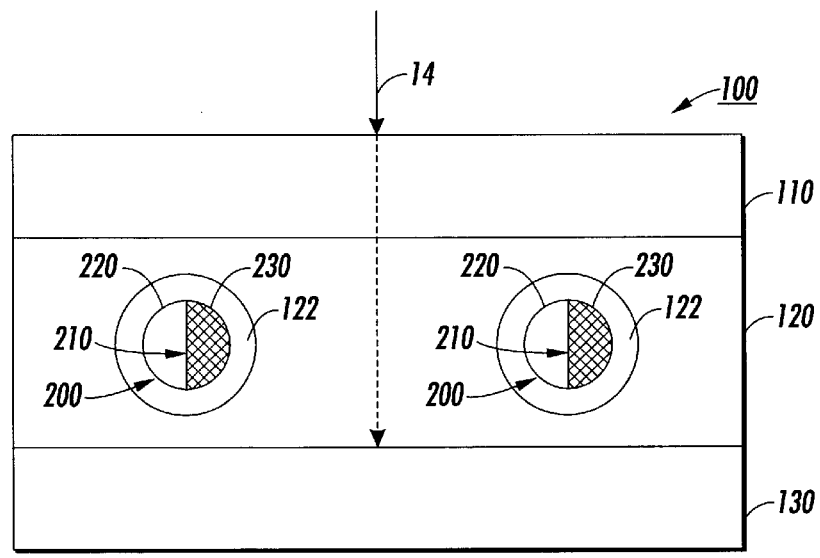
FIG. 1 shows a cross-section of one exemplary embodiment of a tribo-electrically addressable display.

FIG. 1 shows a cross-sectional view of one exemplary embodiment of a sheet 100 of tribo-electrically addressable electric paper according to the invention. Specifically, as shown in FIG. 1, a conductive base substrate 130 forms the base substrate of the sheet 100 of tribo-electrically addressable electric paper. A gyricon substrate 120 is formed over the conductive base substrate 130. The gyricon substrate 120 includes gyricon balls 200 disposed within the substrate. Each gyricon ball 200 has two distinct hemispheres 220 and 230, one black and the other white, and each hemisphere 220 and 230 has a distinct electrical characteristic, i.e., a zeta potential with respect to a dielectric fluid, so that the gyricon balls 200 are electrically as well as optically anisotropic.

The gyricon balls 200 are embedded in a sheet of optically transparent material, such as an elastomer layer, that makes up the gyricon substrate 120. The gyricon substrate 120 also contains a multiplicity of spheroidal cavities 122 and is permeated by a transparent dielectric fluid, such as a plasticizer. The fluid-filled spheroidal cavities 122 accommodate the gyricon balls 220. In particular, there is one gyricon ball 200 per cavity 122 in the gyricon substrate 120. The spheroidal cavities prevent the gyricon balls 200 from migrating within the gyricon substrate 120. Each gyricon ball 200 can be selectively rotated within in its respective fluid-filled cavity 122 by applying an electric field to present either the black hemisphere 230 or the white hemisphere 220 to an observer viewing the surface of the sheet 100. Thus, applying an electrical field that is adjustable in two dimensions causes the black and white hemispheres 230 or 220 of the gyricon balls 200 to appear as image elements, i.e., subpixels or pixels of a display.

An insulative layer 110 is then formed over the gyricon substrate 120. The insulative layer 110 may be any polyester or plastic material or any other known or later developed transparent material that is sufficiently insulative that tribo-electrically generated charges persist for a time sufficient to cause the gyricon balls 220 to rotate. The insulative layer 110 is preferably uncoated. Critical features of the insulative layer 110 include its bulk resistivity and its dielectric constant. Bulk resistivity refers to the ability of the material to resist a flow of a charge across its bulk and to hold a voltage. The dielectric constant of the layer is proportional to the capacitance of the layer. The insulative layer 110 is preferably transparent, but if it is not transparent, the conductive base substrate 130 will be transparent.

As shown in FIG. 1, the gyricon ball 200 has two segments 220 and 230. A segment line 210 divides the gyricon ball 200 into two separate sections. The first segment 220 is made using a white pigment. The second segment 230 is made using a black pigment. The gyricon ball 200 can thus either display a white or black face depending on its orientation with respect to a surface of the sheet 100.

Although only two gyricon balls 200 are shown, it should be understood that the gyricon substrate 120 may include a very large number of gyricon balls 200, depending on the resolution desired. Further, although the gyricon balls 200 are described as having two sections, one black and one white, it should be understood that each gyricon ball 200 may have more than two segments and may be any of two or more two colors, not just black and white.

Tribolelectricity is of great importance to xerography, where it is used to impart an electrical charge on the generally dielectric toner particles. This enables the toner particles to be attracted to the image-wise charge on the photoconductor drum, thus developing the charge image. In many forms of xerography, the toner particles are given a charge by causing them to collide and rub against developer beads. The developer beads are given a charge by causing them to collide and rub against developer beads. Some types of coatings will charge the toner beads positive and others negative.

"Xerography and Related Processes", by J. Dessauer et al., The Focal Press, London and New York, First Edition, 1965, pg. 270, describes the triboelectric process in terms of the Fermi levels of the two materials being rubbed together. The direction of charge transfer depends on the relative positions of the Fermi levels. A triboelectric series can be established by listing a variety of materials in the order of their relative Fermi energies. If the window material of the tribo-electrically addressable electric paper 100 is made of a given material, for example, Mylar, and if it is rubbed by a material having a Fermi energy above that of Mylar, that material will donate electrons to the Mylar, charging the Mylar negative. On the other hand, if the Mylar is rubbed by a material having a Fermi energy below that of Mylar, the Mylar will donate electrons to it, leaving the Mylar with a positive charge.

In practice the Fermi energies of insulators are difficult to determine and trial and error is the best method of determining the triboelectric series specific to the chosen window material. According to this embodiment, the window material is rubbed with a trial stylus material and the resultant polarity and magnitude of charge on the window material is measured with an electrostatic voltmeter.

Dessauer farther describes that after two bodies are rubbed together, producing triboelectric charges, it is necessary that at least one of the bodies be a good insulator, thereby preventing the triboelectrically generated charges on one body from recombining with the opposite polarity charges on the other body before the bodies can be effectively separated. The required resistivity is placed at about $10^9$ ohm-cm. The other body can be a conductor. According to this embodiment, it is necessary that the insulative layer 110 have good insulative properties so it will not act to shield the gyricon material from the effects of the triboelectric charge.

In operation, a tribo-electric charge may be applied at the surface of the insulative layer 110, for example, at a point 140 in FIG. 1, by a human finger. In this case, a user seeking to generate a display drags his or her finger on the surface of the insulative layer 110. The user's finger acts as a stylus. The user moves his or her finger in the pattern of the display that is desired. The action of dragging a finger on the transparent insulative layer 110 leaves a charge trail that activates the gyricon balls 200, causing them to rotate one hemisphere toward the surface of the transparent insulative layer 110.

In particular, the tribo-electrically generated charge trail is stored in or on the transparent insulative layer 110 and creates an electric field substantially directed into the gyricon substrate 120. The electric field, generated by the tribo-electrically generated charges stored in or on the transparent insulative layer 110, causes the gyricon balls 200 to rotate to a particular orientation. Generally, the tribo-electric charge generated by the user moving his finger over the transparent insulative layer 110 causes the gyricon balls 200 to rotate so that the black hemisphere faces the transparent insulative layer 110, so that an observer sees a black, i.e., filled-in, pixel. This tribo-electrically generated charge is held for a short while but the image storage properties of the gyricon act so that the black hemisphere faces the surface of the display device until it is disrupted by a subsequent opposite electric field.

The display can be erased by using an "eraser" that applies a charge opposite to the tribo-electric charge applied by the user to address the display. Such an "eraser" generates a tribo-electric charge in or on the insulative layer 110 that has an opposite polarity to the charge generated by the user. The action of dragging the "eraser" on the insulative layer 110 leaves a charge trail that has the opposite polarity to the charge trail of the user to activate the gyricon balls 200, causing the gyricon balls 200 to rotate the opposite hemisphere toward the surface of the insulative layer 110.

In particular, the tribo-electrically generated charge trail is stored in or on the surface of the insulative layer 110 and induces an electric field opposite the electric field generated by the stylus or the finger of the user. This electric field generated by the charges stored in the transparent layer 110 causes the gyricon balls 200 to rotate to a particular orientation. Generally, the tribo-electric charge generated by the eraser causes the gyricon balls 200 to rotate so that the white hemisphere faces the insulative layer 110, so that an observer sees a white, i.e., blank or empty, pixel.

Thus, the electrical properties of the transparent insulative layer 110 are important for the functioning of the tribo-electrically addressable display. Specifically, the insulative layer 110 must be sufficiently insulative to hold the tribo-electric charge applied by the user or the eraser and it must have sufficient capacitance to store this charge for enough time for the balls to rotate, in spite of the leakage of charge caused by the finite conductivity of the layer 110. The bulk resistivity $\rho$ and the dielectric constant $\beta$ are important. The product of the bulk resistivity and the dielectric constant ($\rho\epsilon$) is the time constant T. The time constant T of a material corresponds to the rate of charge dissipation in that material. Generally, given the bulk resistivity, the dielectric constant and the time constant, the rate of charge dissipation follows the exponential formula $e^{-t/T}$, where t is the time elapsed.

In general, to successfully address the tribo-electrically addressable sheet 100 of the gyricon display according to the invention, the insulative layer 110 must be able to hold a sufficient charge for a sufficient amount of time to allow an electric field, sufficient to cause the gyricon balls 200 to rotate, to persist in the sheet 100. Thus, there is a maximum rate of dissipation above which the sheet 100 will not be able to be addressed. The relationship can be expressed as:

$$\rho\epsilon > T_{address,\,max},\tag{1}$$

where:

$\rho$ is the bulk resistivity of the film;

$\epsilon$ is the dielectric constant of the film; and $T_{address,\,max}$ is the time needed for complete rotation of all balls, typically 100 milliseconds.

Thus, as shown by the relationship above, the product $\rho\epsilon$, or the time constant T, of the material used to form the insulative layer 110 must exceed the worst case time constant $T_{address,\,max}$, i.e., the rate of charge dissipation must be less than the minimum dissipation that still allows rotation of the balls.

The tribo-electrically addressable sheet 100 can be used to form a display according to this embodiment that can be manufactured in many different configurations. For example, the tribo-electrically addressable sheet 100 can be made in the size of a standard notepad, which can then be used like a conventional sheet of paper allowing easy transportability. Alternatively, the tribo-electrically addressable sheet 100 can be constructed in the size of a scribble or chalk board. A tribo-electrically addressable scribble board can have adhesive backing allowing the display to be connected to a surface, such as, for example, a door or wall. The advantages of a tribo-electrically addressable scribble board include the ability to address the board using the touch of a finger, rather than requiring a pen, marker or chalk, which can easily be lost.

According to another exemplary embodiment of the invention, a gyricon display is provided which is addressed by a conductive stylus connected to a power supply but is not affected by stray or excessive tribo-electric charges, such as caused by handling. The gyricon display according to this exemplary embodiment is referred to as a tribo-electrically suppressed display.

Figure 2:
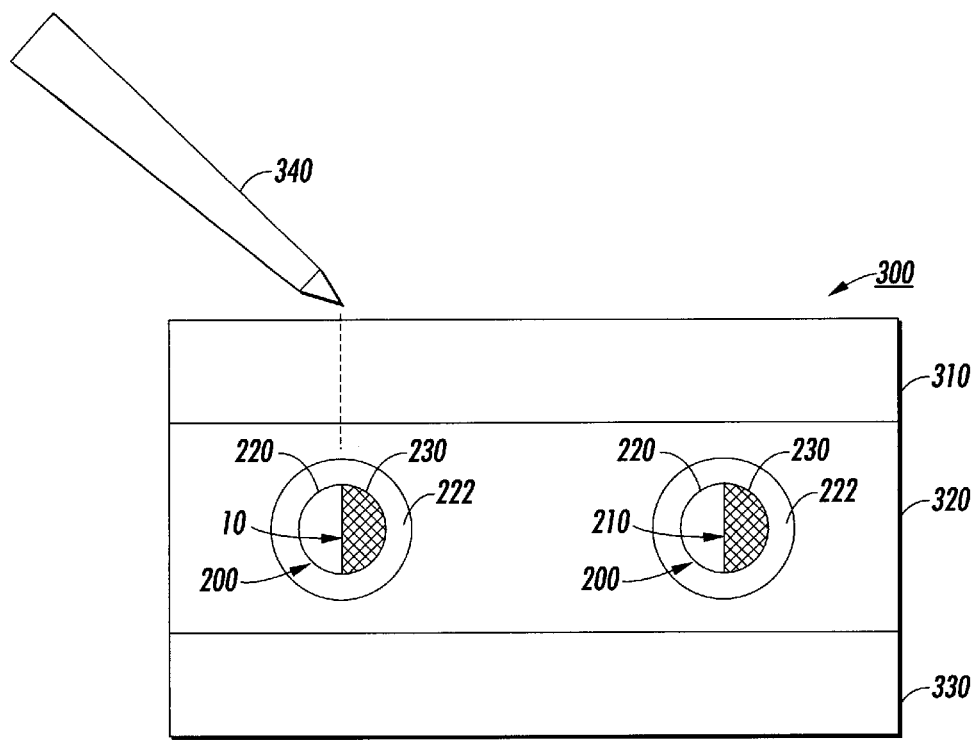
FIG. 2 shows a cross-section of one exemplary embodiment of a tribo-electrically suppressed gyricon display.

FIG. 2 is a cross-sectional view of one exemplary embodiment of a sheet 300 of a tribo-electrically suppressed electric paper according to the invention. Specifically, FIG. 2 shows a tribo-electric display addressable using a stylus that includes a conductive base substrate 330 that forms the base substrate of the sheet 300 of the tribo-electrically suppressed electric paper. A gyricon substrate 320 is formed over the conductive base substrate 330. The gyricon substrate 320 includes the previously-described gyricon balls 200 disposed within the substrate.

As described in connection with the previous embodiment, each gyricon ball 200 has two distinct hemispheres 220 and 230, one black and the other white, and each hemisphere 220 and 230 has a distinct electrical characteristic, i.e., a zeta potential with respect to a dielectric fluid, so that the gyricon balls 200 are electrically as well as optically anisotropic. The gyricon balls 200 are embedded in a sheet of optically transparent material, such as an elastomer layer, that makes up the gyricon substrate 320.

A dielectric layer 310 having a structure of transparent conductive islands on its outer surface is then formed over the gyricon substrate 320. The transparent dielectric layer 310 may be any polyester or plastic material or any other known or later developed transparent material that is sufficiently insulative, i.e., has a sufficiently high surface resistivity and a sufficiently high volume resistivity, such that stylus-deposited charges will be stationary for a long enough time to cause the gyricon balls 220 to rotate. The transparent conductive islands may be any material, such as indium tin oxide, that is sufficiently conductive that the stylus moving across them at normal writing speed will be able to deposit enough charge on them to nearly or completely raise their voltages to that of the stylus. Typically, this means that the transparent conductive layer should have a resistivity less than a few tens of thousand of ohms per square inch. As described above in connection with the tribo-electrically addressable electric paper, critical features of the transparent dielectric layer 310 includes its bulk resistivity and its dielectric constant, since these determine how long an individual island retains the charge given to it by the stylus.

In conventionally addressable displays, which are addressed by a stylus 340, inadvertent contact of the gyricon display with a user's finger rather than with the stylus can inadvertently cause rotation of the gyricon balls due to tribo-electric effects. This display greatly reduces this problem by selecting an appropriate bulk resistivity for the gyricon substrate 320 and, optionally, the window substrate 310. This allows the triboelectric charge, which is limited in magnitude and occurs over a very short period of time, to be conducted away in a short time compared with the minimum address time, thus causing no ball rotation. Since the stylus is connected to a power supply it can sustain the voltage required for ball rotation for a long enough time to cause ball rotation. Optionally, the window substrate 310 can also be conductive, especially if large amounts of tribo-electric charge are to be encountered.

The following relationship illustrates the relation between the time constant of the elastomer part of the gyricon layer 320 and the minimnum rate of charge dissipation needed to suppress unwanted ball rotation:

$$\rho\epsilon < T_{address,\ max}, \quad (2)$$

where:

$\rho$ is the bulk resistivity of the elastomer;

$\epsilon$ is the dielectric constant of the elastomer; and $T_{address,\ max}$ is the minimum time for which some ball rotation is possible, typically 20 msec.

Thus, the relationship described above shows that for a given material used to form the transparent conductive layer 310 and/or the gyricon substrate 320, the product of $\rho*\epsilon$ must be less than or equal to the minimum rate of charge dissipation which discharges stray tribo-electric charges. If this is accomplished, stray tribo-electric charges are effectively discharged, while the display can still be addressed by the stylus 340.

The elastomer, which may be a material such as Dow Corning Sylgard 184, has a bulk resistivity in excess of $10^{16}$ ohm centimeters. This can be lowered for the requirements of the invention by the addition of chemicals or dopants that promote conductivity, such as fatty acid salts, exemplified by aluminum stearate. These chemicals may be added to the uncured elastomer. Likewise, the window substrate 310 can be altered as a low conductivity polymer.

The invention has been described in relation to the gyricon display. However, the principles it illustrates can be equally well applied to many other high impedance displays, such as certain liquid crystal displays and electrophoretic displays.

While the invention has been described in conjunction with the preferred embodiments it is described above, as evident that many alternatives, modifications, and variations are apparent to those skilled in the art. Accordingly, the preferred embodiments in the invention set forth above are intended to be illustrative and not limiting. Various changes may be made without departing from the spirit and scope of the invention.

What is claimed is:

1. A tribo-electrically addressable display device, comprising:

a base substrate;

a gyricon layer formed over the base substrate;

an insulative layer formed over the gyricon layer, the insulative layer having a time constant T; and a plurality of gyricon balls disposed in the gyricon layer, each gyricon ball having an optical anisotropy and an electrical anisotropy providing an electrical dipole moment, the electrical dipole moment and the time constant T of the insulative layer rendering the plurality of gyricon balls electrically responsive to a tribo-electrically generated charge on a surface of the insulative layer.

2. The tribo-electrically addressable display device according to claim 1, wherein the gyricon layer comprises an elastomer.

3. The tribo-electrically addressable display device according to claim 1, wherein the insulative layer stores and dissipates the tribo-electrically generated charge at a sufficient rate to cause a predetermined amount of rotation of at least one of the plurality of gyricon balls.

4. The tribo-electrically addressable display device according to claim 1, wherein the time constant T is:

$$T = \rho\epsilon,$$

where:

$\rho$ is the bulk resistivity of the insulative film; and $\epsilon$ is the dielectric constant of the film.

5. The tribo-electrically addressable display device according to claim 4, wherein $T_{address,\ max}$ is a time needed for rotation of the plurality of gyricon balls.

6. The tribo-electrically addressable display device according to claim 5, wherein the display device is addressable only if $T=(\rho\epsilon)$ is greater than or equal to $T_{address,\ max}$.

7. A tribo-electrically suppressible gyricon displace device, comprising:

a base substrate;

a gyricon layer formed over the base substrate;

a insulative layer formed over the gyricon layer, the insulative layer having a time constant T; and a plurality of gyricon balls disposed in the gyricon layer, each gyricon ball having an optical anisotropy and an electrical anisotropy providing an electrical dipole moment, the electrical dipole moment and the time constant T of the insulative layer rendering the gyricon ball electrically non-responsive to a tribo-electrically generated charge on a surface of the insulative layer.

8. The tribo-electrically suppressible gyricon display device according to claim 7, wherein the plurality of gyricon balls are not responsive to a tribo-electrically generated charge on the a surface of the insulative film when the time constant T of the insulative film is less than a valve $T_{address/min}$.

9. The tribo-electrically suppressible gyricon display device according to claim 7, wherein the time constant T is:

$$T = \rho \epsilon,$$

where:
 $\rho$ is the bulk resistivity of the insulative film; and
 $\epsilon$ is the dielectric constant of the film.

10. The tribo electrically addressable display device of claim 3, wherein the predetermined amount of rotation enabled by the insulative layer is determined based on the optical and electrical anistopies of the plurality of gyricon balls.

11. The tribo electrically addressable display device of claim 10, wherein, when the optical and electrical anistropies comprise N distinct regions of each of the plurality of gyricon balls, the predetermined amount of rotation is 360°/N.

* * * * *